United States Patent [19]

Da Silva, Jr.

[11] 4,309,942
[45] Jan. 12, 1982

[54] CITRUS PRESS

[75] Inventor: Artur F. Da Silva, Jr., São Paulo, Brazil

[73] Assignee: U.S. Philips Corporation, New York, N.Y.

[21] Appl. No.: 167,951

[22] Filed: Jul. 14, 1980

[30] Foreign Application Priority Data

Jul. 19, 1979 [BR] Brazil .................................. 7904613

[51] Int. Cl.³ .............................................. A23N 1/00
[52] U.S. Cl. ...................................... 99/501; 99/508; 220/20
[58] Field of Search .................................. 99/501–508, 99/448, 291, 316, 318; 220/20

[56] References Cited

U.S. PATENT DOCUMENTS

D. 167,667  9/1952  Babany .................................. 220/20
1,507,880  9/1924  Zouvelos ............................... 99/503
1,634,569  7/1927  Bray ..................................... 220/20
3,261,494  7/1966  Walker, Jr. ........................... 220/20

Primary Examiner—Philip R. Coe
Assistant Examiner—Timothy F. Simone
Attorney, Agent, or Firm—Thomas A. Briody; William J. Streeter; Rolf E. Schneider

[57] ABSTRACT

There is provided a citrus press having a juice receptacle constituted by two substantially concentric cylinders forming an annulus. An annular partition interconnects the two cylinders and divides the annulus into a larger section and a smaller section, the smaller section opening into a spout at the location of the partition. In a first position of the receptacle, juice may be collected and held in the larger section. Upon inversion of the receptacle, juice may be collected in the smaller section for delivery via the spout.

1 Claim, 2 Drawing Figures

CITRUS PRESS

This invention relates to a citrus press, comprising a housing which accommodates a motor, a pressing cone which is drivable by the motor, a filter, and a juice receptacle which can be placed underneath said filter.

In principle, two types of citrus press are known, namely one type in which the extracted juice is collected via a spout in a cup or other container arranged adjacent the citrus press, and another type in which the extracted juice is collected in a jug or other receptacle disposed underneath the filter, which jug also serves for holding as well as pouring out the juice. The capacity of this last-mentioned type of citrus press is determined by the capacity of the jug. The first-mentioned type of citrus press may be used almost continuously. When the cup or other container placed underneath the spout is full, it may be immediately replaced by another cup or container.

It is the object of the present invention to provide a citrus press which combines the two above-mentioned features.

To this end the citrus press in accordance with the invention is characterized in that the juice receptacle has a larger section and a smaller section and can be placed in two positions, namely a first position in which the larger section serves for collecting and holding the juice, and a second position, obtained by juice receptacle, in which the smaller section serves for collecting the juice and delivering it, via a spout, into a container placed adjacent the juice receptacle.

A preferred embodiment of the citrus press is characterized in that the juice receptacle is constituted by two substantially concentric cylinders forming an annulus and an annular partition which interconnects the two cylinders and divides the annulus into the larger section and the smaller section, said smaller section opening into a spout at the location of the partition.

By so modifying the structure of the juice receptacle, a citrus press can surprisingly be used in the two aforementioned manners.

The invention will now be described in more detail with reference to the accompanying drawings, in which.

Figure 1:
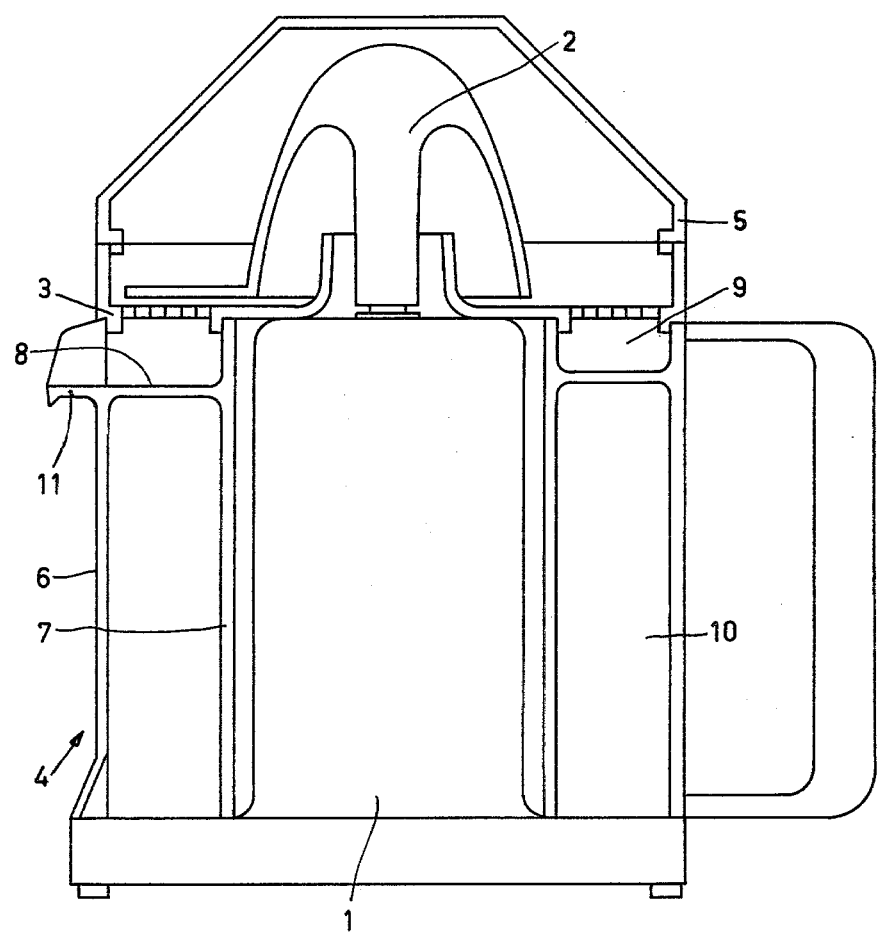
FIG. 1 shows the citrus press with the juice receptacle placed in position for continuous use.

The citrus press comprises a housing 1, which accommodates a motor, not shown, a pressing cone 2 which is drivable by the motor, a filter 3, and a receptacle 4 for collecting the extracted juice. A cover 5 may be placed on the juice receptacle 4. The juice receptacle 4 is formed by two concentric cylinders 6 and 7 and an annular partition 8, which interconnects the two cylinders and annulus therebetween into a smaller section 9 and a larger section 10. At the location of the partition 8 the section 9 opens into a spout 11. The juice receptacle is placed over the housing 1. In the position of the juice receptacle shown in FIG. 1, the citrus press may be used continuously. For this purpose a container, for example a cup is placed underneath the spout 11. Via the filter 3 the extracted juice flows onto the partition 8 and subsequently via the spout 11 into the cup. To this end, the partition 8 is preferably slightly outwardly inclined.

Figure 2:
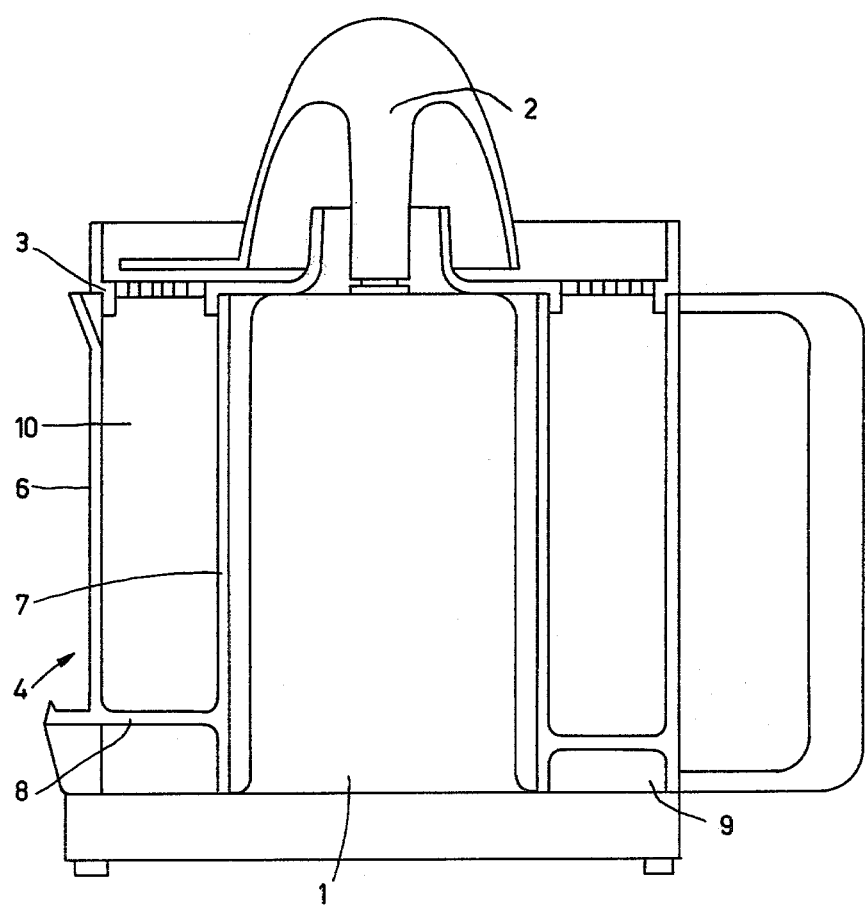
FIG. 2 shows the citrus press of FIG. 1, with the juice receptacle inverted for using the larger section.

If use is to be made of the larger section, the pressing cone 2 and the filter 3 are removed first, subsequently the juice receptacle 4 is inverted and the filter and the pressing cone are replaced. The arrangement then obtained is illustrated in FIG. 2. The larger section 10 now collects and holds the extracted juice. The receptacle itself may then also be used for pouring out the juice.

What is claimed is:

1. A citrus press which comprises a pressing cone drivable by a motor; a juice filter; a juice receptacle for placement underneath the filter, the juice receptacle being constituted by two concentric cylinders forming an annulus; an annular partition interconnecting the two cylinders and dividing the annulus into a larger section and a smaller section; and a spout associated with the smaller section, the spout being located at the partition; the juice receptacle being placeable in a first position for collecting and holding juice in the larger section and, upon inversion, in a second position for collecting juice in the smaller section for continuous discharge via the spout.

* * * * *